United States Patent [19]
Vorhis

[11] Patent Number: 4,690,375
[45] Date of Patent: Sep. 1, 1987

[54] SELF CLOSING SQUEEZE VALVE

[76] Inventor: Daniel J. Vorhis, P.O. Box 4183, Seattle, Wash. 98104

[21] Appl. No.: 882,837

[22] Filed: Jul. 7, 1986

[51] Int. Cl.⁴ .......................... F16K 31/00; B65D 5/72
[52] U.S. Cl. .................................... 251/342; 251/348; 222/490; 222/513; 222/529; 222/547; 604/34; 604/256
[58] Field of Search ............... 222/490, 494, 511, 513, 222/528, 529, 547, 212; 138/119; 251/7, 123, 341, 342, 348; 604/34, 250, 256

[56] References Cited
U.S. PATENT DOCUMENTS

| 1,362,186 | 12/1920 | Price | 222/529 X |
| 2,674,064 | 4/1954 | Gassaway | 251/348 |
| 2,775,060 | 7/1956 | Twyman | 251/342 |

Primary Examiner—Joseph J. Rolla
Assistant Examiner—Gregory L. Huson

[57] ABSTRACT

An improved self closing squeeze valve for use with fluid dispensing containers comprising a resilient and deformable valve body into which one or two wafers of similar material are permanently inserted causing a normal state of blockage and seal. Manual pressure on the valve body causes all components to deform, allowing passage of a fluid.

4 Claims, 10 Drawing Figures

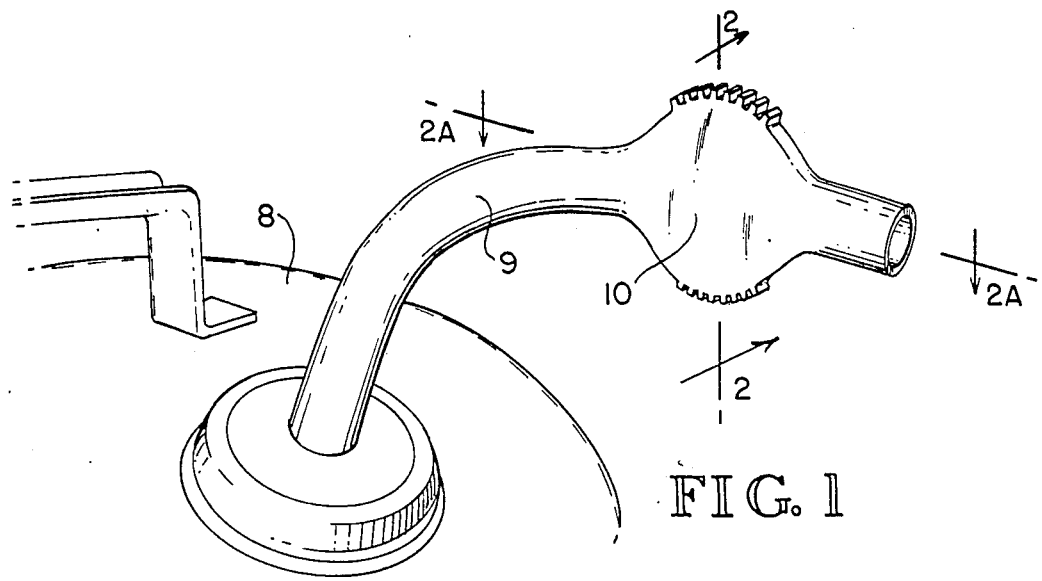
FIG. 1
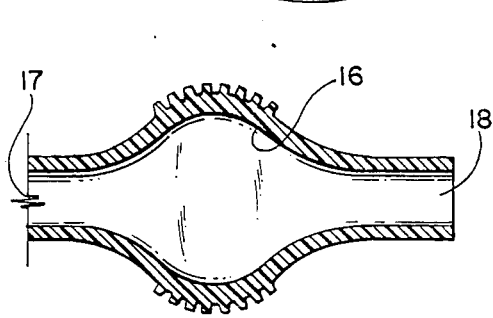
FIG. 2
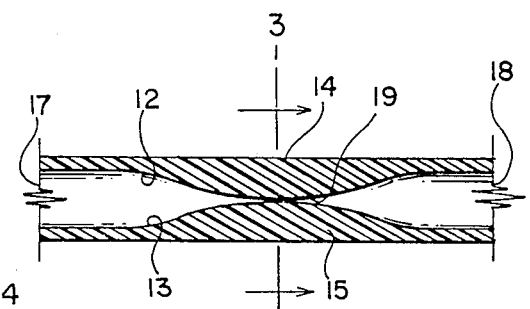
FIG. 3
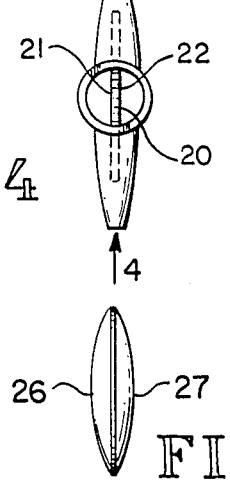
FIG. 4
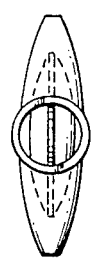
FIG. 6
FIG. 7
FIG. 5
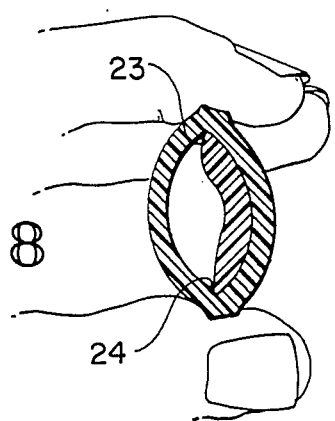
FIG. 8

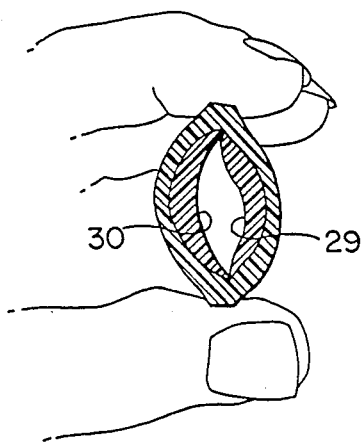
FIG. 9
FIG. 10
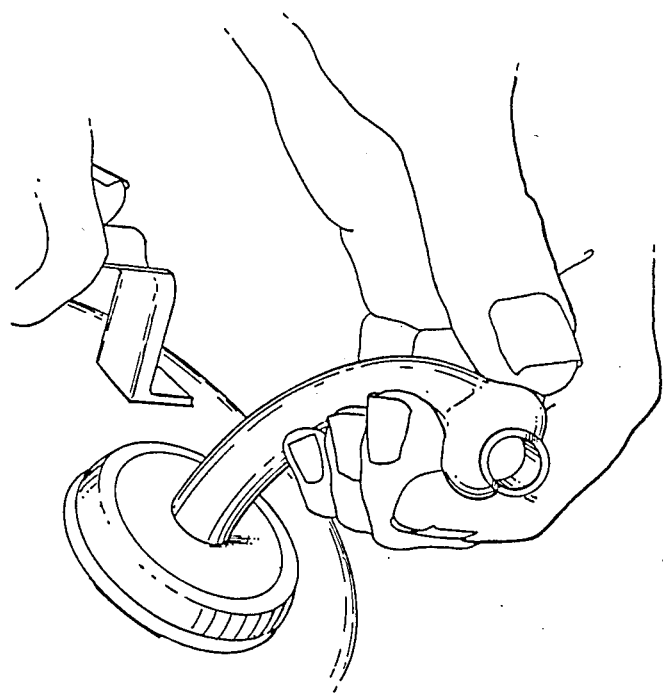

SELF CLOSING SQUEEZE VALVE

BACKGROUND OF THE INVENTION

1. Field

This invention is in the general field of dispensing apparatus and specifically valve apparatus for use with fluid containers such as gasoline cans. More specifically, it is in the field of valves for controlling the outflow from containers and, still more specifically, valves made of flexible material and operated by the flexing of the material, i.e. squeezing the valve.

2. Prior Art:

There are many flexible valves in the prior art. Some of these valves are activated and opened by the pressure of the contents against the valve, as in a toothpaste dispensing tube. Others are designed to dispense discrete solid objects. Still others are designed to dispense drops of material. In some cases the valve is designed to be opened and closed by some mechanical leverage against the valve opening. Such valves cannot be worked instantaneously and may be inadvertently left open.

Examples of known prior art closest to the subject invention are disclosed in the following U.S. Pat. Nos.

| | |
|---|---|
| 2,272,653 | 2,937,795 |
| 2,316,516 | 3,684,137 |
| 2,546,709 | 3,773,233 |

There are also commercially available nozzles for garden hoses which are valves made of resilient material and which open when flexed and automatically close when released. Further, there are a variety of spring clips which serve to control flow in resilient tubes. The clips can be made so that the spring force either closes off the flow by squeezing the tube shut or allows the tube to be open, in which case an operator must overcome the spring force to close off the tube.

It has been found that none of the prior art meets all of the requirements of a valve intended to solve a common problem associated with dispensing fluid into a reservoir such as gasoline into the fuel reservoir of a small gasoline engine and particularly the very small fuel or fuel/oil reservoirs found on the recently available, lightweight 2 cycle engines. The problem is the tendency of the fuel to overflow, causing risk of fire or explosion on a hot engine, risk of damage to lawn or asphalt, and increased health risks associated with harmful vapors.

Specifically, the solution to the problem requires that the positioning of the spout of the outflow apparatus and the operation of the valve to control outflow be accomplished by one hand. Further, the valve must be located at the end of the outflow apparatus so that there is no residue available to spill after the valve is closed.

Therefore it is an object of the present invention to provide a valve which allows instant cessation of the flow of fluid from a dispensing container.

Another object is that the valve be inexpensive. Yet another object is that the valve be usable at the outflow end of the dispensing apparatus so that it may be positioned and operated by one hand.

Further objects are that the valve be loss proof and self closing. Also, and specifically, it is an object that the valve design be such that repeated use does not cause splitting or tearing at stress points in the resilient structural material.

All of the foregoing and still further objects of the invention will be apparent from the following disclosure, taken in conjunction with the accompanying drawings.

SUMMARY OF THE INVENTION

The subject invention is a valve which is a part of or attaches to the output end of a spout, hose or the like through which a fluid is delivered, such as gasoline. The valve is intended to seal against low level fluid pressure such as the pressure developed when pouring from a one gallon or five gallon can.

The valve comprises a hollow elastomeric body having an inlet and an outlet. In one embodiment one wafer-like part is fitted into the hollow interior of the body. In a second embodiment two wafers are fitted into the hollow. The shapes of the interior and the wafer-like parts (wafers) are such that when the assembly is at rest the wafers block flow from the inlet to the outlet. When the body is distorted by finger pressure applied by an operator, the wafers also distort and a passage is opened for flow through the valve.

The body and the cavity in it are essentially elliptical in side (elevational) view and in crossection. The distortion forces are applied at the ends of the cross sectional ellipse at the midpoint between the inlet and outlet. The distortion tends to transform the cross sectional shape from elliptical toward circular.

An essential feature of the concept is that there are no sharp creases or ends of slits in the components. Under distortion the stresses at such creases and ends tend to be excessive, leading to premature failure of parts in which they exist. This freedom from creases and slit ends is enabled by the use of the wafers.

BRIEF DESCRIPTION OF THE DRAWINGS

FIG. 1 is a top perspective view of a self-closing squeeze valve made integral with a spout.

FIG. 2 is a cross section taken in plane 2—2 of FIG. 1.

FIG. 3 is a cross section taken in plane 2a—2a of FIG. 1.

FIG. 4 is a view of the valve body in the direction indicated by arrow A in FIG. 1.

FIG. 5 is a side view of the wafer used in the single wafer embodiment.

FIG. 6 is a front view of the wafer shown in FIG. 5.

FIG. 7 is a view of the valve from the same direction as FIG. 4 but showing the effects of the insertion of the wafer into the body.

FIG. 8 is a sectional view of the valve taken at plane 3—3 in FIG. 3 and illustrates the manner in which finger pressure applied to the valve body causes the deformation of the normally adjacent and sealed internal walls of valve body and wafer to allow passage of a fluid.

FIG. 9 is a sectional view taken at plane 3—3 FIG. 3 of a second embodiment of the invention, illustrating how finger pressure applied to the valve body in which two wafers have been inserted causes deformation similar to that illustrated in FIG. 8.

FIG. 10 is a perspective view of the valve in use and opened ready for fluid flow.

DETAILED DESCRIPTION OF THE INVENTION

The terminology squeeze valve refers to valves which are operated by being squeezed, such as between the thumb and forefinger of the hand of an operator.

Referring to the drawings, it will be evident that there are two kinds of parts in the subject squeeze valve, the valve body and the wafer or wafers, which are designed to be inserted into and remain in the cavity in the valve body.

FIGS. 1 through 4 are various views of the valve body 10 shown integrated with spout 9 on container 8.

FIGS. 2 and 3 illustrate the shape of the body and of the cavity. The cavity 11 comprises side surfaces 12 and 13, which are the inner surfaces of side walls 14 and 15 respectively, and a peripheral surface 16. Inlet port 17 allows fluid flow into the cavity and outlet port 18 allows fluid flow out of the cavity. In this embodiment the inlet port, cavity and outlet port have a common longitudinal axis. There are fillets at the junctures of the side surfaces and peripheral surface and at all other junctures related to the cavity in the body, such as the junctures of ports 17 and 18 with side surfaces 12 and 13. The term fillet as used here is well known in the machine design art and refers to the radiused surfaces at the junctures of one surface with another.

It can be seen in FIG. 3 that the sidewalls 14 and 15 vary in thickness to form a throat section 19 which, when the body is relaxed, is a narrow slot 20 with parallel straight sides 21 and 22 and radiused (filleted) ends 23 and 24 (FIG. 8). When wafer 25 shown in FIGS. 5 and 6, is inserted into the body, sides 21 and 22 are deformed to match the curvature of sides 26 and 27 of the wafer and the contact between sides 21 and 22 of the slit and 26 and 27 of the wafer and the rim 28 of the wafer and ends 23 and 24 provide a seal preventing flow from the inlet port to the outlet port.

As shown in FIG. 8, deformation of the valve and wafer by finger pressure causes the body sides to spread apart and the wafer to buckle to one side or the other, providing an open passage from inlet port to outlet port. Relaxing the finger pressure allows the resilience of the parts to re-establish the seal. This opening is effected because as the body is deformed the crosssectional area of slot 20 in a plane transverse to the longitudinal axis and as shaped by the presence of the wafer increases while the crosssectional area of the wafer (FIG. 6) does not increase. The finger pressure is applied in the direction indicated by arrows 4 and 4' in FIG. 4.

A second embodiment is shown in FIG. 9. In this embodiment wafer 25 is replaced by two wafers, 29 and 30, each of which is shaped like a half of wafer 25 divided through its circular plane of symmetry. Each wafer is flat on one side and essentially convex on the other and, with their flat surfaces in contact, they occupy the space of the single wafer in the first embodiment. The flat surfaces become sealing surfaces in addition to those described for the first embodiment. In this second embodiment, when the valve is deformed by finger pressure, one wafer deflects to one side and the other to the other side. This occurs because, with one side of each wafer flat and the other convex, the structural neutral axis in the edge to edge direction is bowed toward the convex side and therefore the wafer collapses in that direction.

FIG. 10 illustrates the valve being positioned and operated by one hand.

Selections of materials and determinations of methods of manufacture for this invention are considered to be well within the capabilities of persons of ordinary skill in the art. The material must obviously be resilient, hard enough to maintain structural integrity, soft enough to allow the required structural deflection under reasonable finger forces and resistant to any fluids to be used with the valve.

It can be understood from the drawings and description that the invention meets its objects.

Flow from the valve will cease instantly when finger pressure is removed. The valve is inexpensive to manufacture, comprising two or three molded parts. It is clearly usable at the outflow end of dispensing apparatus so that the positioning of the end and operation of the valve can be managed with one hand. It is loss proof, being part of or fastened to the spout of the apparatus. And, since there are no sharp creases or slit ends, the valve will endure repeated use for long periods with considerable less chance of developing unwanted cracks or tears than the prior art devices incorporating such sharp creases and ends of slits.

It will be understood by those skilled in the art that other embodiments and variations of those described are possible without exceeding the scope of this invention which is limited only by the appended claims.

What is claimed is:

1. A self-closing squeeze valve comprising:
   a body,
   at least one resilient and deformable wafer,
   said body being resilient and deformable and having:
      a longitudinal axis,
      an inlet port,
      an internal cavity,
      an outlet port,
   said inlet port, said cavity and said outlet port being interconnected to form a passage through said body,
   said passage having a first cross sectional area in a plane essentially transverse to said longitudinal axis of said body as formed and when at rest, and
   a second cross sectional area in said plane with said body deformed
   said second cross sectional area being larger than said first cross sectional area,
   said at least one wafer being inserted in said cavity and having a third cross sectional area larger than said first cross sectional area and smaller than said second cross sectional area, whereby, with said at least one wafer inserted into said cavity, said body is deformed to adapt said first cross sectional area to essentially equal said third cross sectional area to close said passage, and, when
   said body and wafer are further deformed, such as by finger pressure applied by an operator, said passage is deformed to said second cross sectional area such that said passageway opened.

2. The valve of claim 1 having first and second wafers, said first and second wafers being inserted in said cavity and having a fourth combined cross sectional area larger than said first cross sectional area and smaller than said second cross sectional area, whereby, with said two wafers inserted in said cavity, said body is deformed to adapt said first cross sectional area to essentially equal said fourth cross sectional area and said passage is closed and with said body and wafers further deformed, such as by finger pressure applied by an operator, said passage is deformed to said second cross sectional area such that said passageway is opened.

3. The valve of claim 1 in which said cavity comprises:
- a first side,
- a second side,
- a peripheral surface,
- junctures between said first side and said peripheral surface and between said second side and said peripheral surface,
- said junctures being fillets.

4. The valve of claim 2 in which said cavity comprises:
- a first side,
- a second side,
- a peripheral surface,
- junctures between said first side and said peripheral surface and between said second side and said peripheral surface,
- said junctures being fillets.

* * * * *